United States Patent [19]

Dykes

[11] 4,177,603
[45] Dec. 11, 1979

[54] PLANT DESTRUCTION USING ELECTRICITY

[75] Inventor: Willis G. Dykes, Vicksburg, Miss.

[73] Assignee: Lasco, Inc., Vicksburg, Miss.

[21] Appl. No.: 859,110

[22] Filed: Dec. 8, 1977

[51] Int. Cl.² .......................................... A01M 21/00
[52] U.S. Cl. .......................................... 47/1.3; 361/20
[58] Field of Search .............................. 47/1.3; 361/20

[56] References Cited

U.S. PATENT DOCUMENTS

| 492,635 | 2/1893 | Sharp | 47/1.3 |
|---|---|---|---|
| 546,682 | 9/1895 | Scheible | 47/1.3 |
| 2,007,383 | 7/1935 | Opp | 47/1.3 |
| 2,682,729 | 7/1954 | Poynor | 47/1.3 |
| 2,687,597 | 8/1954 | Rainey | 47/1.3 |
| 2,962,632 | 11/1960 | Gillaspie | 361/20 |
| 3,210,603 | 10/1965 | Calfee et al. | 361/20 |
| 3,329,886 | 7/1967 | Weir | 361/20 X |
| 3,559,337 | 2/1971 | Marcoux et al. | 47/1.3 |
| 3,919,806 | 11/1975 | Pluenneke et al. | 47/1.3 |
| 3,935,670 | 2/1976 | Pluenneke et aL. | 47/1.3 |

FOREIGN PATENT DOCUMENTS 515502  7/1976  U.S.S.R. ..................................... 47/1.3

Primary Examiner—Robert E. Bagwill
Attorney, Agent, or Firm—Cushman, Darby & Cushman

[57] ABSTRACT

A machine and method for destroying plant growth. A specialty application is provided for plant growth around and between railroad tracks, and a general description is provided for preventing damage to the high voltage source of electricity used for the plant destruction, and for minimizing the number of fires started in dry material accessory to plant destruction. A vehicle with a high voltage electricity source is mounted on railroad tracks, with wheels of each wheel set for the vehicle being electrically isolated, and the high voltage source being grounded through one of the wheels. Special plant contacting devices comprising rounded end generally cylindrical contacting members are provided. The current output of the high voltage source is limited to prevent damage to the high voltage source, and the no-load voltage of the high voltage source is held to generally the same level as the full-load current limited voltage to minimize the number of fires started by the plant contactors.

28 Claims, 7 Drawing Figures

4,177,603

PLANT DESTRUCTION USING ELECTRICITY

BACKGROUND AND SUMMARY OF THE INVENTION

There have been proposals in the prior art for the destruction of vegetation around and between railroad tracks by the application of electricity to the vegetation, such as shown in U.S. Pat No. 546,682, however, such prior proposals have been impractical and are not in use commercially. Commercially, plants growing around and between railroad tracks are destroyed by spraying chemicals on the plants, and while this method is effective it is relatively expensive and there can be adverse environmental effects on the surrounding land, especially where the tracks pass through cropland. According to the present invention, a specific structure is provided that is eminently suitable for killing plants around and between railroad tracks, and which is commercially feasible. Also, according to the present invention a more general method and apparatus are described for preventing damage to the high voltage source despite the fact that the actual plant contacting means associated with the plant destruction device pass through areas of greatly differing plant density, by limiting the current output of the high voltage electricity source for plant destruction; and the number of fires in dry material associated with plants being contacted are minimized by reducing the no-load voltage of the high voltage source to generally the same level as the full-load current limited voltage thereof. While the current-limiting and no-load voltage controlling aspects of the present invention are particularly useful for destruction of plants in and around railroad tracks, they also have general applicability to plant destruction in general, such as is provided by U.S. Pat. No. 3,919,806, and copending application Ser. No. 795,087, filed May 9, 1977.

According to one aspect of the present invention, a machine for destroying plant growth around and between a pair of railroad tracks is provided. The machine comprises a vehicle having at least two sets of wheels adapted to ride on the tracks, the wheels of each set being electrically isolated from each other, and a source of high voltage electricity mounted on and movable with the vehicle. Means are provided for connecting the high voltage source of electricity to ground, including through one wheel of at least one of the wheel sets. Means are provided for destroying plants around and between the railroad tracks, such means including a generally horizontally disposed rod mounted on the vehicle, plant contacting means operatively connected to the rod, and means for operatively electrically connecting the plant contacting means to the high voltage source, the plant contacting means transferring electricity from the high voltage source to ground through the plants contacted thereby. The plant contacting means may comprise a plurality of vertically disposed chains connected to the rod outside the tracks, and a plurality of downwardly extending support rods connected to the horizontal rod and having leaf spring plant contactor members connected thereto. Alternatively, in order to reduce arcing by minimization of the voltage gradient in close proximity to the plant contacting surface, the plant contacting means may comprise a plurality of rounded-end generally cylindrical contacting members having the longitudinal axes thereof disposed generally perpendicular to the direction of movement of the vehicle. Such cylindrical members are operatively connected to the horizontally disposed rod by spring members, and a generally triangular plate mounted between each spring member and the corresponding cylindrical member, and bolts or the like for mounting the spring member to the generally horizontal rod. The end portions of the horizontal rod extending past the railroad tracks may be pivotally mounted to the middle portion of the rod so that the end portions may pivot out of the way of unyielding obstructions which might be engaged thereby, but will return to their original position after the obstruction in past. Their original position may be at an angle α of about 15° in back of the middle portion. Additionally, the cylindrical members may be staggered in the dimension of movement of the vehicle so that loose material in the path thereof can pass between adjacent cylindrical members, and the end portions of the generally horizontally extending rod can be mounted for pivotal movement about a generally horizontal axis from a position about 90° above the middle portion, to a position about 45° below the middle portion of the generally horizontally extending rod.

According to another aspect of the present invention, a machine for destroying plants with electricity is provided comprising a high voltage source of electricity, electrically conductive means adapted to be operatively mounted to a vehicle for movement with the vehicle, and for transferring electricity from the high voltage source to ground through plants to be destroyed thereby, and means for limiting the current output of the high voltage source so that damage to the high voltage source is prevented even during extended operation of the machine. The high voltage source may comprise a fossil-fuel powered electric generator, a generally stable voltage electric power source, a voltage regulator operatively connected to the generally stable voltage electric power source and to an excitor field for the fossil-fuel power generator, and a step-up transformer operatively connected to the high voltage generator. The current limiting means then comprises a variable resistor operatively connected between the voltage regulator and the excitor field. Additionally, the machine may further comprise means for controlling the no-load voltage of the high voltage source to a maximum level so that the number of fires started during the no-load situation in material around the plants being treated are minimized. Such controlling means may comprise a variable transformer disposed in a sensing circuit for the voltage regulator, the transformer capable of reducing the no-load voltage to generally the same level as the full-load current limited voltage.

According to yet a further aspect of the present invention, a method of destroying plants is provided comprising providing a high voltage source of electricity, operatively connecting the source to plant contacting means, contacting the plants to be destroyed with the plant contacting means, regulating the voltage of the high voltage source, and controlling the no-load voltage of the source so that it is substantially the same as the full-load voltage of the source. A method of destroying plants is also provided comprising the steps of providing a high voltage source of electricity, operatively connecting the source to plant contacting means, contacting plants to be destroyed with the plant contacting means, and regulating the voltage of and limiting the current output of the high voltage source so that damage to the high voltage source is prevented even during extended operation.

It is the primary object of the present invention to provide improved methods and apparatus for destroying plant growth with electricity. This and other objects of the invention will become clear from an inspection of the detailed description of the invention, and from the appended claims.

DETAILED DESCRIPTION OF THE DRAWINGS

Figure 1:
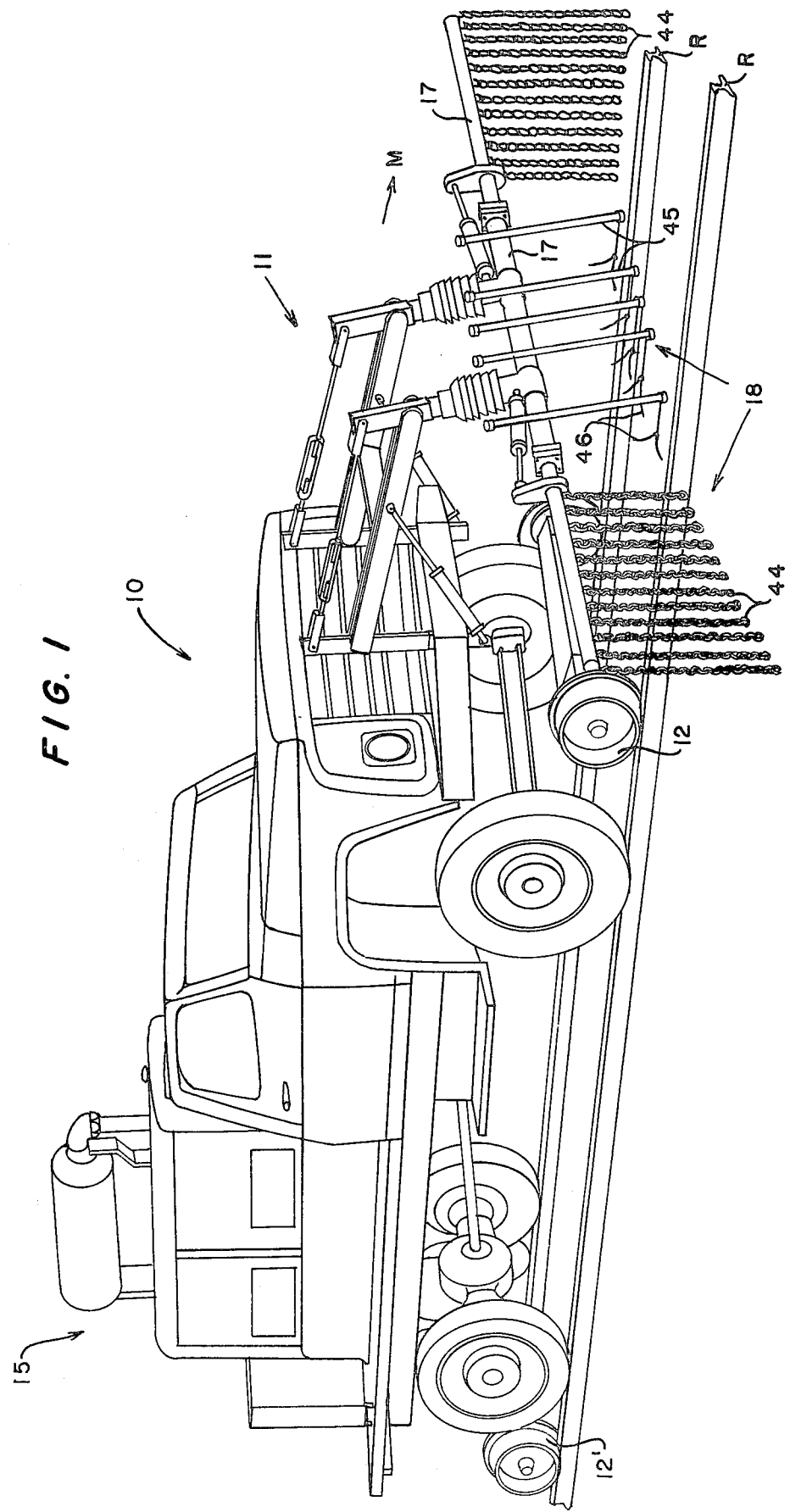
FIG. 1 is a perspective view of an exemplary machine for destroying plant growth around and between railroad tracks, according to the present invention.

The machine for destroying plant growth with electricity, in general, and for destroying plant growth around and between a pair of railroad tracks, in particular, is illustrated in the drawings. The machine may comprise a vehicle 10 having at least two sets 12, 12' of two wheels each adapted to ride on railroad tracks R,R, the wheels of each set being electrically isolated from each other by a non-conductive means 13 or the like (see FIG. 2) disposed in the axle 14 between the wheels of the wheel set 12,12'. A source 15 (see FIGS. 1 and 2) of high voltage electricity is mounted on and movable with the vehicle 10, and means are provided for connecting the high voltage source 15 to ground, such means comprising one wheel of at least one of the wheel sets 12,12' (see FIG. 2). Means 16 are provided for destroying plants around and between the railroad tracks R,R, such means including a generally horizontally disposed rod 17 mounted on the vehicle 10 through an assembly 11 for adjusting the position of the rod 17 with respect to the ground, plant contacting means 18 operatively connected to the rod 17, and means (such as connector 19—see FIG. 2) for operatively electrically connecting the plant contacting means 18 to the high voltage source 15, the plant contacting means 18 transferring electricity from the high voltage source 15 to ground through plants contacted thereby. The wheels of the wheel sets 12,12' of the vehicle 10 are electrically isolated by the means 13 in order to prevent excessive tripping of railroad crossing switches and the like, which might occur should such electrical isolation not be provided and an electric current established between the two rails R,R (as can be the case with the prior art rail mounted plant killers such as shown in U.S. Pat. Nos. 492,635 and 565,671).

The high voltage source 15 preferably includes a generally stable voltage electric power source 20, a voltage regulator 21, a fossil-fuel powered electric generator 23, the voltage regulator 21 being operatively connected to the source 20 and an excitor field 22 for the generator 23, and a step-up transformer 24 operatively connected to the high voltage generator 23. The generator 23 may be a diesel generator capable of generating 480 volts, and the source 20 may be an electric generator that is belt driven from the diesel generator 23. Since the speed of rotation of the power shaft of conventional diesel generators 23 is stable, the source 20 can maintain a generally stable voltage of about 120 volts.

Figure 2:
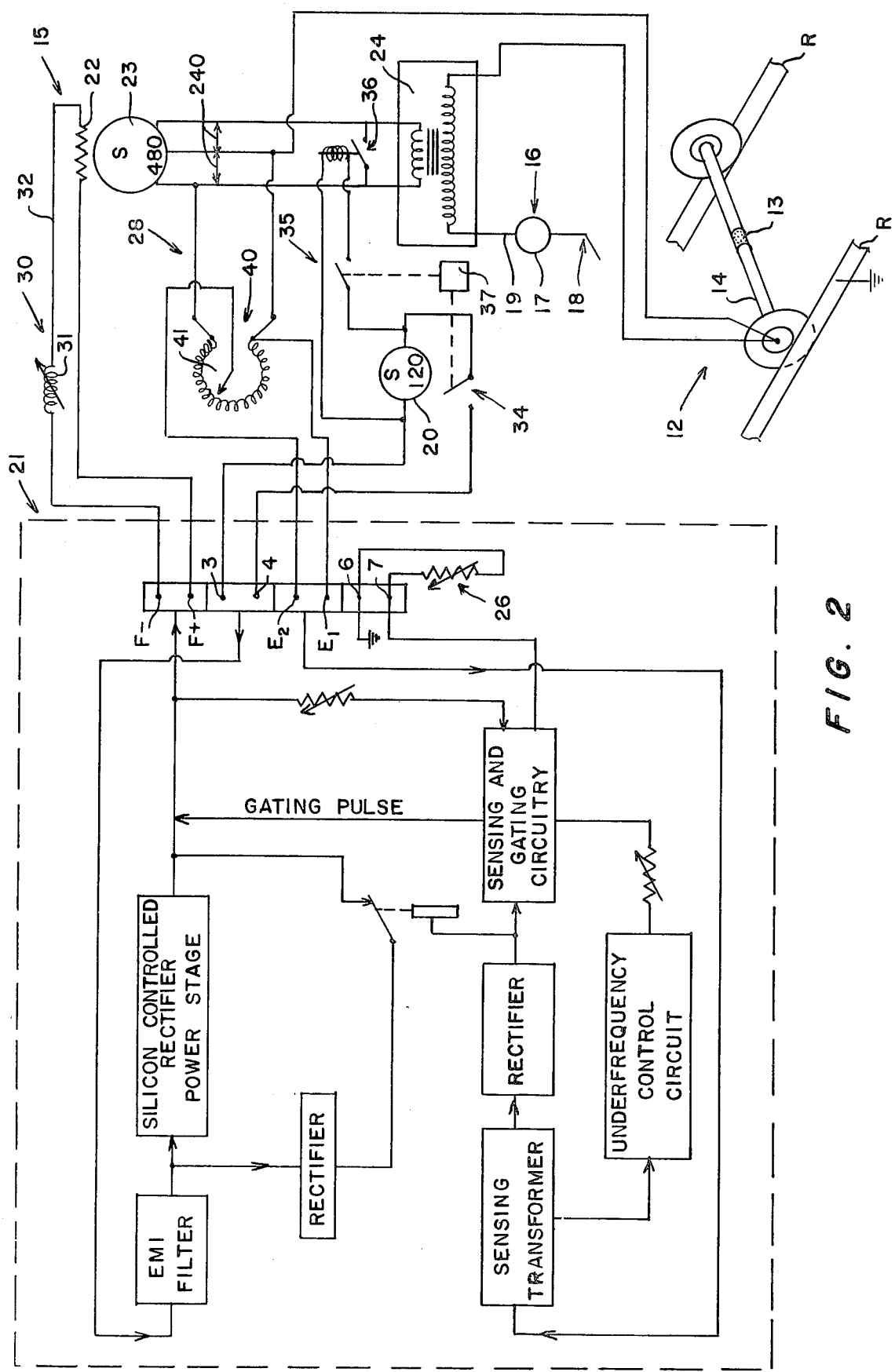
FIG. 2 is a schematic showing the electrical hook-ups for current limiting and no-load voltage controlling according to the present invention.

The voltage regulator 21 may be selected from a wide variety of commercially available voltage regulators. The regulator illustrated schematically in FIG. 2 is a Basler KR4FF voltage regulator, which is commercially available from Basler Electric of Highland, Ill., and has been found to be eminently suited for the present purposes. Such regulators 21 are designed to provide field excertation to generators such that the terminal voltage is regulated to within less than 1% for loads from 0 to full load. This regulation is achieved by sensing the terminal voltage—through sensing circuitry means 28—and using this signal to control the firing of silicon controlled rectifiers which provide the DC inputs to the generator field 22, which is resistive. If the sensed voltage drops below the desired value, the SCR's are fired earlier in each cycle, increasing the field current which increases the generator output current and restores the output to the desired level. If the terminal voltage is not restored, the SCR's are turned on earlier and earlier until the voltage applied to the excitor field 22 is a maximum value as determined by the design of the regulator 21. This is called the "field forcing mode" of operation, and at this point the generator 23 output current may well be 300 to 400% of its rated value. An external voltage adjust rheostat 26 is provided connected across terminals 6 and 7 of the regulator 21, while the sensing circuit 28 is connected to terminals E1 and E2 of the regulator 21, the power source 20 is connected across terminals 3 and 4 of the regulator 21, and the excitor field 22 is connected across terminals F+ and F— of the regulator 21.

According to the present invention, it is desired to limit the current output of the high voltage source 23 so that damage thereto is prevented, since the 300 to 400% of rated value current output of the generator 23 during the "field forcing mode" will soon burn out the generator windings. The loading imposed on the generator 23 for weed killing applications is such that the 300 to 400% rated value output current will be achieved in normal operation—especially in the rail embodiment—since the plant density varies greatly, and since the plants being treated at any instant in time form a load in which the plants are in parallel with each other. The current limiting means 30 preferably comprises a variable resistor 31 which is operatively connected in the line 32 between the voltage regulator 21 (contacts F+ and F—) and the excitor field 22. The control for the variable resistor 31 is preferably mounted in the cab for the vehicle 10, or other convenient place, so that the total field resistance can be manually adjusted to a level such that with maximum regulator output voltage (field forcing mode) the excitor field current will be limited to a value which will correspond to a non-destructive generator current level. Since the no-load exciting current for rated terminal voltage is normally less than the exciting current for rated (continuous) output current, the no-load voltage of the machine is unaffected by such an arrangement. The resistor 31 may be a 3.5 amp 50 ohm conventionally available resistor.

According to the present invention it is also desirable to provide an on/off type control of the generator 23 output. For this purpose, a first switch means 34 (such as a double single throw normally open 10 amp switch) is provided in series with the source 20, between the source 20 and the voltage regulator 21. However, there is some residual magnetism in the field of the generator 23 so that even with the current effectively terminated to the excitor 22, there is still a small voltage output from the generator 23. When this voltage is applied to the step-up transformer 24, it may wind up to several hundred volts on the secondary side of the transformer 24. In order to eliminate this residual high voltage condition—which may be a safety hazard since rod 17 may still be energized—second switch means 35 are provided to short out the output of the generator with a 50 amp normally open contactor 36. A solid state time delay relay 37 is preferably provided to provide a delay of about one second between the opening of first switch means 34 and second switch means 35. This delay allows the magnetic field to collapse sufficiently before the leads are shorted together so that the contacts do not burn out.

In many situations where apparatus for destruction of plant growth is utilized, and especially for destroying plant growth in and around railroad tracks, readily combustible material, such as dead or dry grasses, leaves, etc., exists around the plants to be treated. In many situations, tall weeds grow up through the dead or dry grasses and leaves, etc. When there are a large number of weeds or other plants being treated at any one time, there normally is no fire hazard since the load (provided by the plants) is great enough so that the voltage is reduced to about 30 to 60% of the normal no-load value, and the electrical current is confined to the interior portions of the plants being treated. Under such circumstances there is little or no electrical arcing to the ground. However, if the population density of the plants being treated becomes very low, the load impedance is increased to the point where the output voltage of the system builds back up and reaches rated values. Under such circumstances, the plant stems that are contacted are literally disintegrated on contact, exploding with a loud popping sound, and excessive arcs are established between the contacting members 18 and the plant stems and the ground. The amount of energy delivered to plants during this condition is greatly in excess of the minimum levels required to produce a lethal effect, and there is a distinct problem of causing fires should dry grasses, etc., be present. According to the present invention, means 40 are provided for controlling the no-load voltage of the high voltage source 23 and holding it to a maximum level so that the number of fires started during the no-load situation in material (i.e., dry grasses, etc.) around the plants being treated are minimized and so that the amount of energy applied during the no-load situation to any plants that might be contacted is held to an amount more closely approximating the minimum level required to produce a lethal effect on the plants, and thus conserving energy. Such means 40 preferably comprise a variable transformer 41 disposed in the sensing circuit 28 for the voltage regulator 21, the transformer 41 being capable of reducing the no-load voltage of the source 23 to generally the same level (or slightly above) the full-load current limited voltage of the source 23. Since the terminal voltage is routed through the variable transformer 41 before applying it to the sensing input E1, E2 for the voltage regulator 21, the terminal voltage signal may be multiplied or divided before dispensed by the regulator 21. For instance, if the transformer 41 is set at 100% voltage, then the 240 terminal voltage is passed on, full value, into the 120 volt sensing circuit 28. The sensing circuit 28 determines that this voltage is much too high so it reduces the output of the regulator 21 until the voltage being sensed is equal to 120 volts AC. In this case then, the output voltage would be reduced to 120 volts from the nominal 240. Alternatively, assume the transformer is adjusted to 50% voltage the voltage regulator 21 would then adjust its output so that the sensed voltage, which is not 50% of the output voltage, is equal to 120 volts which would then correspond to a full 240 volts at the terminal of the generator 23. Alternatively, if the transformer 41 was set at 25% voltage, the regulator 21 would try to set aside the 120 volts sensing circuit 28 and would provide 120 volts divided by 0.25, or 480 volts at the terminals of the generator 23. The transformer 41 preferably is a STACO model 252 or equivalent, which is capable of adjusting the terminal voltage all the way from zero to 240 volts (100% to 0%). The control for the transformer 41 also preferably is located in the cab of the vehicle 10, along with the control for the first switch means 34 and the variable resistor 31.

While the current limiting, on/off switching, and no-load controlling means of FIG. 2 have been described with particular reference to a rail-mounted vehicle, it is to be understood that such means could be utilized with any electrical plant destruction structure, such as shown in U.S. Pat. No. 3,919,806 and copending application Ser. No. 795,087 filed May 9, 1977.

Figure 5:
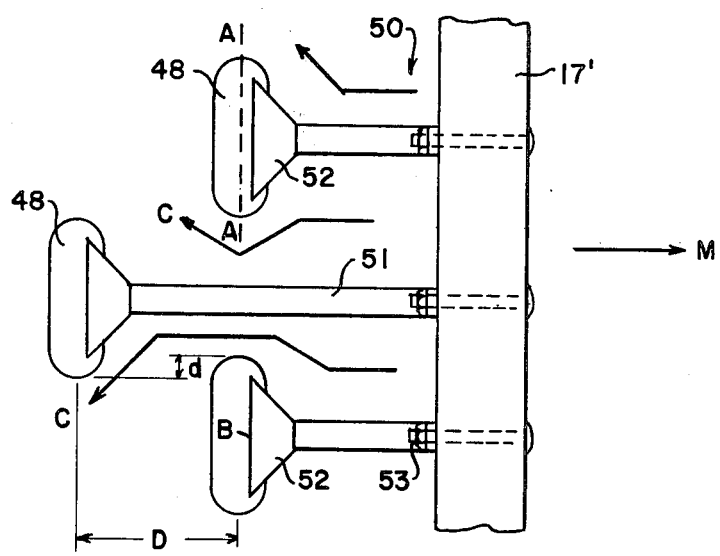
FIG. 5 is a top plan view showing the contactors of FIG. 4.

For the rail-mounted embodiment of the machine according to the present invention illustrated in FIG. 1, the plant contacting means 18 may comprise two types—a plurality of vertically disposed chains 44 connected to the rod 17 outside of the tracks R,R, and a plurality of downwardly extending support rods 45 connected to the rod 17 and having leaf-spring plant contactor members 46 connected thereto. The chains 44 preferably are provided so that the outermost chains are longer than the innermost chains, corresponding to the normal gradation surrounding railroad tracts R,R and the members 45,46 can be of a wide variety of types, such as shown in U.S. Pat. No. 3,919,806. Additionally, the rod 17 itself may be energized so that plants contacted thereby are also destroyed, and/or an additional horizontally extending rod (not shown) may be provided located vertically above the rod 17, and connected to a higher voltage winding of the transformer 24, as shown in FIG. 5 of copending application Ser. No. 795,087.

While the structure illustrated in FIG. 1 is very suitable for treatment of plant growth around and between railroad tracts R,R the structure illustrated in FIGS. 3 through 7 is normally even more efficient for this purpose. The structure is illustrated in FIGS. 3 through 7 is primarily characterized by plant contacting means 18 which include a plurality of rounded-end generally cylindrical contacting members 48, and means 50 for operatively connecting the contacting members 48 to the rod 17 so that the longitudinal axes A—A (see FIG. 5) thereof are disposed generally perpendicular to the direction of movement M of the vehicle 10, and extend downwardly from the rod 17. The members 48 are shaped as illustrated in order to reduce arcing by minimization of the voltage gradient in close proximity of the surfaces thereof. While such a configuration is especially useful for a rail-mounted vehicle 10, it may also be useful for other electrical plant destruction applications.

Figure 4:
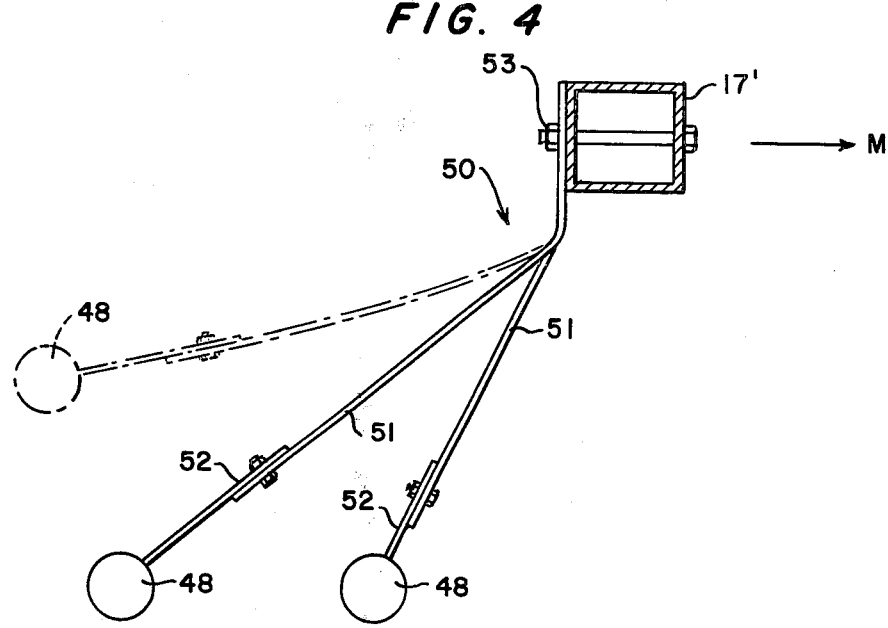
FIG. 4 is a view taken along lines 4—4 of FIGS. 3 and 6 showing exemplary plant contactors according to the invention.

As shown most clearly in FIGS. 4 and 5, the connecting means 50 preferably comprise means for mounting the members 48 so that they overlap in the dimension perpendicular to the dimension of movement M of the vehicle 10, and so that they are staggered in the dimension of movement M of the vehicle. This allows loose material (trash, loose plant material, etc.) which would not normally deflect the members 48 upwardly to pass between adjacent members 48, as indicated by arrows C in FIG. 5. Suitably, the spacing D in the dimension M between adjacent members 48 as shown in FIG. 5 is about eight inches, while the adjacent members 48 overlap a distance d of about one-half inch. The connecting means 50 preferably include, associated with each member 48, a spring member 51, and a generally triangular plate 52 mounted between each spring member 51 and the cylindrical member 48, with the base B of the plate mounted to the cylindrical member, and means 53 (such as a nut and bolt connection for the spring member 51) for mounting the spring member 51 to the generally horizontal rod 17. As shown in dotted line in FIG. 4, such a connecting means allows the members 48 to move upwardly out of the path of large obstructions that might be encountered thereby, and as shown in FIG. 5 the provision of the triangular plates 52 facilitates movement of trash material between the members 48 and out of interferring relationship therewith. The spring members 51 are of sufficient stiffness so that the members 48 will not be deflected upwardly by engagement with plants, but only upon engagement with relatively large, hard, unyielding objects.

Figure 3:
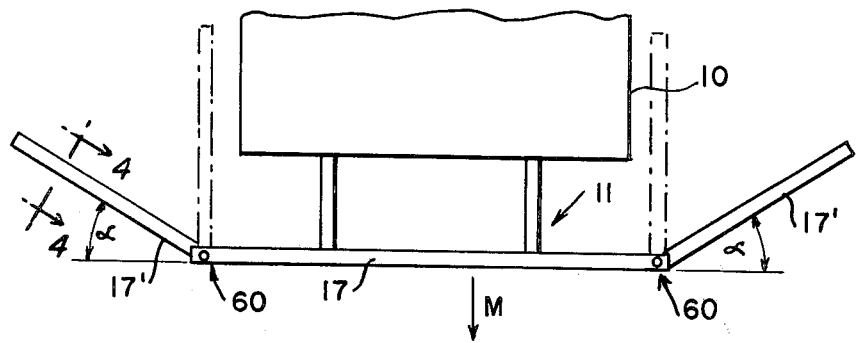
FIG. 3 is a schematic top view showing exemplary plant contactor supporting rod means according to the invention.
Figure 6:
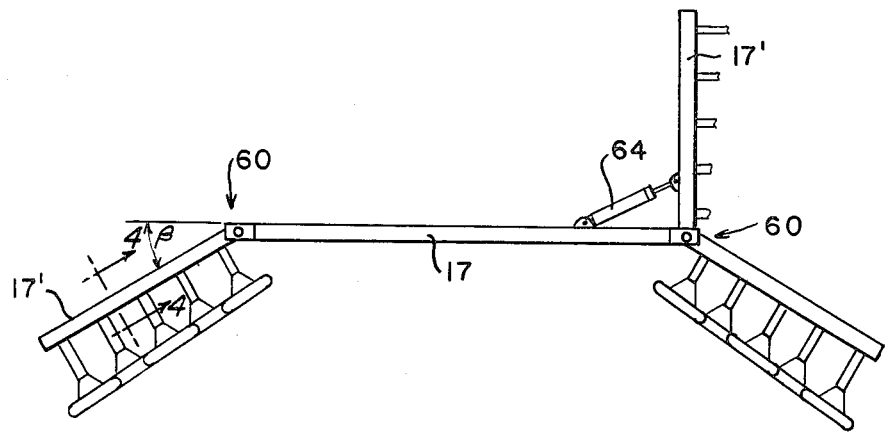
FIG. 6 is a front view of the structure of FIG. 3, additionally showing the plant contactors.
Figure 7:
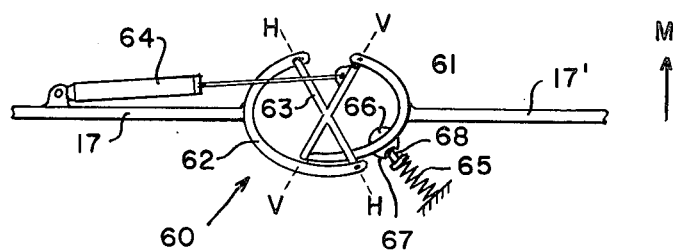
FIG. 7 is a schematic showing of exemplary pivotal mounting means for the horizontal rod end portions.

As shown most clearly in FIGS. 3, 6, and 7, the generally horizontally extending rod 17 preferably includes a pair of end portions 17' extending outwardly from a middle portion (17). For the rail-mounted embodiment, the middle portion 17 would be substantially the same length as the distance between the pair of tracks R,R, and normally the middle portion 17 would have associated therewith the rods 45 with spring contracts 46 as illustrated in FIG. 1, while the members 48 were mounted on the end portions 17'. Mounting means 60 are provided for mounting the end portions 17' for pivotal movement with respect to the middle portion 17 so that the end portion 17' may pivot out of the way of unyielding obstructions (i.e., poles, signal markers, very large metallic equipment, stacked railroad ties, and the like) which might be engaged thereby, but will return to their original position after the obstruction is passed. Normally, the mounting means 60 maintain the end portions 17' in back of the middle portion 17, at a positive angle α with respect to the middle portion 17 (see FIG. 3). The angle α preferably is about 15°, the angle α being provided to facilitate the movement out of the way of obstructions, and to allow shedding of vines or other large plant materials which might otherwise have a tendency to build up on the end portion 17' and connecting means 50 or the like. Where no vertical movement of the end portions 17' with respect to the middle portion 17 is necessary, the means 60 may comprise a simple pivot arrangement with a spring pressure and detent arrangement for holding arms 17' in place yet allowing pivotal movement out of the way of obstructions.

Normally, it is desirable to provide the mounting means 60 so that the end portions 17' also are pivotally movable about a horizontal axis from a position above the middle portion making a substantially 90° angle with respect to the middle portion 17 (see the right side of FIG. 6) to a position below the middle portion 17 making a large positive angle β with respect to the middle portion (see the left side of FIG. 6). The angle β may be selected so that it is as great as 45°, so that even where the gradation along the sides of railroad is especially large, even smaller plants located a significant distance from the rails may be destroyed.

The means 60 for mounting the rod end portions 17' with respect to the middle portion 17 may comprise a wide variety of available structures. One such structure is shown schematically in FIG. 7 and comprises a conventional universal joint (such as a Hooke's joint) but a wide variety of other universal joints are also acceptable, however. The joint 60 illustrated schematically in FIG. 7 comprises a pair of yoke members 61,62 connected by a spider 63, with rods extending within the spider 63 for rotation of the members 61,62 about horizontal and vertical axes H—H and V—V, respectively. A hydraulic cylinder 64 or the like may be provided for moving each end portion 17' about the horizontal axis H—H, the cylinder 64 pivoted at one end thereof to the middle portion 17 and at the other end thereof to an upper portion of the spider 63. The means for insuring that the end portions 17' return to the original position (i.e., the angle α) in which they are disposed after pivoting out of the way of obstructions may include a spring means 65, a cam 66 mounted to yoke 61 and having a detent recess 67 formed therein, and a cam follower 68 engageable with the recess 67 and the surface of the cam 66 and with the spring means 65. When sufficient force is exerted on an end portion 17' opposite the direction M, the cam follower 68 is moved against the bias of spring 65 out of the detent recess 67, and engages the periphery of the cam 66, compressing the spring means 65. After the obstruction has passed, the follower 68 acts on the periphery of the cam 66 to bias the yoke 61 to rotate the end portions 17' in direction M until the follower 68 engages the detent recess 67, the original position (i.e., making the angle α) of the end portions 17'.

A method of destroying plants is also provided according to the present invention, which utilizes apparatus such as that shown in FIG. 2. Such method includes the steps of providing a high voltage source (15) of electricity, operatively connecting the source (15) to plant contacting means (16), contacting plants with the plant contacting means (16) so that electricity sufficient to destroy plants contacted thereby is passed from the high voltage source (15) to ground through plants contacted thereby, and regulating the voltage of, and limiting the current output of, the high voltage source (15) so that damage to the high voltage source (15) is prevented even during extended operation. According to another method of the present invention, plants are destroyed by providing a high voltage source of electricity (15), operatively connecting the source to plant contacting means (16) and contacting plants with the plant contacting means (16) so that electricity sufficient to destroy plants contacted thereby is passed from the high voltage source to ground through the plants, regulating the voltage of the high voltage source (with means 21), and controlling the no-load voltage of the of the source so that it is substantially the same as the full-load voltage of the source (with means 40).

An exemplary mode of operation of a machine according to the invention will now be set forth:

A vehicle 10 is mounted by wheels sets 12,12' on railroad tracks R,R, with an electrical isolator 13 being provided between the wheels of each set 12,12', and with one wheel of one set serving as the ground for a high voltage source of electricity 15 mounted with the vehicle 10. The cylinder 64 is actuated to pivot the end portion 17' of the generally horizontally extending rod 17 about a horizontal axis H—H from an inoperative position (right side of FIG. 6) to a position wherein the maximum number of plants outside of the rails R,R will be contacted by the plant contacting means 18 (making an angle $\beta$ as shown on the left-hand side of FIG. 6). The connecting means 50 mount the plant contacting cylinders 48 so that they will be deflected upwardly out of the way of unyielding obstructions which they might encounter, and so that trash material may pass between adjacent contacting members 48, yet the contacting members will contact all plants in their path. The mounting means 60 provides for mounting of the end portions 17' making an angle $\alpha$ with respect to the middle portion 17, and so that the portions 17' will pivot out of the way of obstructions yet will return to their original position (making an angle $\alpha$) in which original position maximum shedding of plant materials having a tendency to cling to end portions 17' and connecting means 50 is provided.

The diesel generator 23 through a belt drive powers the generally stable voltage 120 volt source 20, which source 20 is connected out through voltage regulator 21 to an excitor field 22 for the source 23, with a sensing circuit 28 being provided between the output from source 23 and the voltage regulator 21. The operator in the vehicle 10 adjusts the variable resistor 31 of the current limiting means 30 so that the maximum current output of the generator 23 is at a level that will not destroy the generator windings, and the operator in the cab or vehicle 10 also adjusts the manual transformer 41 of no-load controlling means 40 so that the no-load voltage is generally at the same level as the full-load current limited voltage of the generator 23. In this way burn up of the generator 23 is prevented, and energy is conserved and the number of fires started under the no-load situations are minimized. The operator then controls the first and second switch means 34,35 so that the various circuits are completed, the generator 23 is started up, and the vehicle 10 powers itself along the rails R,R destroying all plant growth contacted by the plant contacting means 18. When treatment is completed or is to be interrupted, the operator merely opens the first switch means 34, which through time delay 37 opens the second switch means 35 and closes the 50 amp switch 36 in the generator 23 output.

While the invention has been herein shown and described in what is presently conceived to be the most practical and preferred embodiment thereof, it will be apparent to those of ordinary skill in the art that many modifications may be thereof within the scope of the invention, which scope is to be accorded the broadest interpretation of the appended claims so as to encompass all equivalent structures and methods.

What is claimed is:

1. A machine for destroying plant growth around and between a pair of railroad tracks, said machine comprising:

a vehicle having at least two sets of two wheels adapted to ride on said tracks, the wheels of each set electrically isolated from each other, a source of high-voltage electricity mounted on and movable with said vehicle, means for connecting said high-voltage source of electricity to ground, said means comprising one wheel of at least one of said wheel sets, means for destroying plants around and between the railroad tracks, said means including a generally horizontally disposed rod mounted on said vehicle, plant contacting means operatively connected to said rod, and means for operatively electrically connecting said plant contacting means to said high voltage source of electricity, said plant contacting means for transferring electricity from said high voltage source to ground through plants contacted thereby.

2. A machine as recited in claim 1 further comprising means for limiting the current output of said high-voltage source so that damage to said high-voltage source is prevented.

3. A machine as recited in claim 2 wherein said high voltage source comprises a fossil-fuel powered electric generator; a generally stable voltage electric power source; a voltage regulator operatively connected to said generally stable voltage electric power source and to an excitor field for said fossil-fuel powered generator; and a step-up transformer operatively connected to said high-voltage generator;

and wherein said current limiting means comprises a variable resistor operatively connected between said voltage regulator and said excitor field.

4. A machine as recited in claim 3 further comprising first switch means disposed between said generally stable voltage electric power source and said voltage regulator, and second switch means operatively connected to said first switch means through a time-delay for short-circuiting said fossil-fuel generator and eliminating output current from said transformer due to residual magnetism in the field of said fossil-fuel generator.

5. A machine as recited in claim 2 further comprising means for controlling the no-load voltage of said high-voltage source to a maximum level so that the number of fires started during the no-load situation in material around the plants being treated are minimized.

6. A machine as recited in claim 5 wherein said high voltage source comprises a fossil-fuel powered electric generator; a generally stable voltage electric power source; a voltage regulator opertively connected to said generally stable voltage electric power source and to an excitor field for said fossil-fuel powered generator; and a step-up transformer operatively connected to said high-voltage generator; and wherein said controlling means comprise a variable transformer disposed in a sensing circuit for said voltage regulator, said transformer capable of reducing the no-load voltage to generally the same level as the full-load current limited voltage.

7. A machine as recited in claim 1 wherein said plant contacting means comprise a plurality of vertically disposed chains connected to said rod outside said tracks, and a plurality of downwardly extending support rods connected to said rod and having leaf-spring plant contactor members connected thereto.

8. A machine as recited in claim 1 wherein said plant contacting means include a plurality of rounded-end generally cylindrical contacting members having the longitudinal axes thereof disposed generally perpendicular to the direction of movement of said vehicle, and further comprising means for operatively connecting said cylindrical contacting members to said horizontally disposed rod.

9. A machine as recited in claim 8 wherein said connecting means comprise, for each cylindrical portion, a spring member, and a generally triangular plate mounted between each spring member and said cylindrical member with the base of the plate mounted to said cylindrical member, and means for mounting said spring member to said generally horizontal rod.

10. A machine as recited in claim 8 wherein said connecting means comprise means for mounting said cylindrical members so that they are staggered in the dimension of movement of the vehicle so that loose material in the path thereof can pass between adjacent cylindrical members.

11. A machine as recited in claim 1 wherein said generally horizontal rod includes a pair of end portions extending outwardly from a middle portion, said middle portion being substantially the same length as the distance between said pair of tracks, and means for mounting said end portions for pivotal movement with respect to said middle portion so that said end portions may pivot out of the way of unyielding obstructions which might be engaged thereby, but will return to their original position after the obstruction is past.

12. A machine as recited in claim 11 wherein said end portions have as the plant contacting means extending therefrom a plurality of rounded-end generally cylindrical members supported on said end portions by spring members attached by generally triangularly shaped plates to said cylindrical members.

13. A machine as recited in claim 12 wherein said cylindrical members are staggered in the dimension of movement of the vehicle so that loose material in the path thereof can pass between adjacent cylindrical members.

14. A machine as recited in claim 12 wherein said middle portion of said generally horizontal rod has as the plant contacting means associated therewith a plurality of downwardly extending support rods connected to said generally horizontal rod and having leaf-spring contactor members connected thereto.

15. A machine for destroying plants, comprising
a vehicle having a source of high voltage electricity mounted for movement therewith;
means for contacting plants for transferring electricity from said high voltage source to ground through plants contacted thereby;
means for operatively connecting said high voltage source to said contacting means;
said plant contacting means comprising a generally horizontally disposed rod, a plurality of rounded-end generally cylindrical contacting members, and means for operatively connecting said contacting members to said rod so that the longitudinal axes thereof are disposed generally perpendicular to the direction of movement of said vehicle, and extend downwardly from said rod; and
said generally horizontal rod including a pair of end portions extending outwardly form a middle portion, and means for mounting said end portions for pivotal movement with respect to said middle portion so that said end portions may pivot out of the way of unyielding obstructions which might be engaged thereby, but will return to their original position after the obstruction is past.

16. A machine as recited in claim 15 wherein said connecting means further comprise means for mounting said cylindrical members so that they overlap in the dimension perpendicular to the dimension of movement of the vehicle, and so that they are staggered in the dimension of movement of the vehicle so that loose material in the paths thereof can pass between adjacent cylindrical members.

17. A machine as recited in claim 15 wherein said generally cylindrical members are provided as plant contact means extending downwardly from said generally horizontally disposed rod end portions, and wherein different plant contact means are provided associated with said rod middle portion.

18. A machine as recited in claim 15 wherein said means for mounting said end portions with respect to said middle portion comprise means for mounting said end portions for pivotal movement about a horizontal axis from a position above said middle portion making substantially a 90° angle with respect to said middle portion, to a position below said middle portion making a large positive angle $\beta$ with respect to said middle portion.

19. A machine as recited in claim 18 wherein said angle $\beta$ is about 45°.

20. A machine as recited in claim 15 wherein said rod end portions mounting means include means for maintaining said end portions in back of said middle portion at a positive angle $\alpha$ with respect to said middle portion.

21. A machine as recited in claim 20 wherein said angle $\alpha$ is about 15°.

22. A machine for destroying plants with electricity, comprising
a voltage regulated high voltage source of electricity,
electrically conductive means adapted to be operatively mounted to a vehicle for movement with said vehicle, and for transferring electricity from said high voltage source to ground through plants to be destroyed thereby, and
means for limiting the current output of said high-voltage source so that damage to said high-voltage source is prevented even during extended operation of said machine.

23. A machine as recited in claim 22 wherein said high voltage source comprises a fossil-fuel powered electric generator; a generally stable voltage electric power source; a voltage regulator operatively connected to said generally stable voltage electric power source and to an excitor field for said fossil-fuel powered generator, and providing said voltage regulation of said source; and a step-up transformer operatively connected to said high-voltage generation;
and wherein said current limiting means comprises a variable resistor operatively connected between said voltage regulator and said excitor field.

24. A machine as recited in claim 23 further comprising first switch means disposed between said generally stable voltage electric power source and said voltage regulator, and second switch means operatively connected to said first switch means through a time-delay for short-circuiting said fossil-fuel generator and eliminating output current from said transformer due to residual magnetism in the field of said fossil-fuel generator.

25. A method of destroying plants comprising the steps of providing a high voltage source of electricity,
operatively connecting the high voltage source to plant contacting means,
contacting plants with the plant contacting means so that electricity sufficient to destroy plants contacted thereby is passed from the high voltage source to ground through plants contacted thereby, and regulating the voltage of, and limiting the current output of, the high-voltage source so that damage to the high-voltage source is prevented even during extended operation.

26. A method as recited in claim 25 comprising the further step of controlling the no-load voltage of the high-voltage source so that it is substantially the same as the full load, current limited voltage of the source.

27. A method of destroying plants comprising the steps of
providing a high voltage source of electricity,
operatively connecting the source to plant contacting means,
contacting plants with the plant contacting means so that electricity sufficient to destory plants contacted thereby is passed from the high voltage source to ground through plants contacted thereby,
regulating the voltage of the high voltage source, and
controlling the no-load voltage of the source so that it is substantially the same as the full-load voltage of the source.

28. A machine for destroying plants, comprising
a vehicle having a source of high voltage electricity mounted for movement therewith,
means for contacting plants for transferring electricity from said high voltage source to ground through plants contacted thereby,
means for operatively connecting said high voltage source to said contacting means,
said plant contacting means comprising a generally horizontally disposed rod, a plurality of rounded-end generally cylindrical contacting members, and means for operatively connecting said contacting members to said rod so that the longitudinal axes thereof are disposed generally perpendicular to the direction of movement of said vehicle, and extend downwardly from said rod; and
wherein said connecting means further comprise, for each cylindrical portion, a spring member, and a generally triangular plate mounted between each spring member and said cylindrical member with the base of the plate mounted to said cylindrical member, and means for mounting said spring member to said generally horizontal rod.

* * * * *